Patented Nov. 28, 1950

2,531,392

UNITED STATES PATENT OFFICE 2,531,392

POLYURETHAN COATING COMPOSITIONS

David S. Breslow, Wilmington, Del., assignor to Hercules Powder Company, Wilmington, Del., a corporation of Delaware No Drawing. Application September 8, 1948, Serial No. 48,337

8 Claims. (Cl. 260—77.5)

This invention relates to new coating compositions and more particularly to wire coating compositions prepared from a toluene triisocyanate-diisocyanate-glycol resin.

Various materials have been utilized in the past for coating and insulating wire. Among the more commonly used coatings which may be mentioned are the conventional enamel or oleoresinous varnish-type coatings, natural or synthetic rubbers, polyvinyl resins, polystyrene resins, etc. All of these coating compositions have been found to be lacking in one respect or another. For example, the enamel or varnish coatings lack adequate flexibility. The rubber coatings are not sufficiently resistant to the action of organic solvents with which such wire is frequently in contact as in refrigeration units, etc. Furthermore, the rubber coatings deteriorate with age and exposure to the atmosphere, resulting in the cracking and peeling of the rubber coating. The polyvinyl and polystyrene resin coatings must be plasticized in order to have sufficient flexibility and consequently are subject to attack by organic solvents. Even if not exposed to solvents, the plasticizers being relatively volatile are lost on aging and these coatings then become brittle. Recently the use of superpolyamides for wire coating has been suggested. The superpolyamides have good flexibility, abrasion resistance and solvent resistance, but they are extremely difficult to apply uniformly to the wire and are exceedingly costly. Many attempts have been made to reduce the cost of such coatings and at the same time reduce the difficulty of application by adding to them other resins such as the alkyd resins, phenol formaldehyde resins, etc. However, the addition of these modifying resins results in a corresponding decrease in the advantageous properties of these polymers.

Now in accordance with this invention it has been found that a superior wire coating composition may be prepared by reacting a glycol with a mixture of isocyanates comprising toluene triisocyanate and a diisocyanate, the two isocyanates being utilized in the molar ratio of from about 1:9 to about 9:1, respectively.

The following examples will illustrate the preparation of the new coating composition in accordance with this invention. All parts and percentages are by weight unless otherwise indicated.

Example 1

A mixture of 955 parts of decamethylene glycol, 695 parts of toluene diisocyanate (a mixture of toluene-2,4- and toluene-2,6-diisocyanates) and 1000 parts of dioxane was heated at 100°–110° C. for 1 hour. To this solution was added a solution of 215 parts of toluene-2,4,6-triisocyanate in 2500 parts of dioxane and the resulting cloudy solution was heated for 30 minutes. This solution was used for coating wire as described in Example 5.

Example 2

Two solutions were prepared. Solution A contained 172 parts of toluene-2,4,6-triisocyanate, 43 parts of decamethylene glycol and 220 parts of n-butyl acetate. Solution B contained 557 parts of toluene diisocyanate (a mixture of toluene-2,4- and toluene-2,6-diisocyanates), 722 parts of decamethylene glycol and 1280 parts of n-butyl acetate. Both solutions were heated on a steam bath until clear. Solution B precipitated on standing but readily redissolved on heating. These two solutions were then mixed just before use in coating wire as described in Example 6 and in coating wood, etc., as described in Examples 8 and 9.

Example 3

Example 2 was repeated except that the molar ratio of triisocyanate to diisocyanate was increased from 1:4 to 3:7. In this case, Solution A contained 258 parts of toluene-2,4,6-triisocyanate, 65 parts of decamethylene glycol and 320 parts of n-butyl acetate. Solution B contained 487 parts of toluene diisocyanate, 735 parts of decamethylene glycol and 1220 parts of n-butyl acetate. These two solutions were then mixed and used for coating wire as described in Example 7.

Example 4

Coating compositions were prepared by heating mixtures of decamethylene glycol, toluene-2,4,6-triisocyanate and toluene diisocyanate in dioxane until the viscosity was sufficient for easy application as a coating. In one the ratio of triisocyanate to diisocyanate in the composition was 6:4 and in the other 8:2, the requisite amount of glycol to react with the isocyanates being used in each case; i. e., 13 and 14 moles, respectively. The films produced from each of these compositions were exceedingly tough and had good flexibility.

The new coating compositions of this invention are prepared by reacting a glycol with a mixture of toluene triisocyanate and a diisocyanate. The reaction product obtained by reacting a glycol with this combination of isocyanates is an insoluble cross-linked polyurethan polymer. Both the di- and tri-isocyanates are necessary to form the polymer having superior wire coating properties. In the absence of toluene triisocyanate, a linear, soluble polymer is formed, and, on the other hand, if no diisocyanate is present, the polymer is completely cross-linked and consequently does not have the required degree of flexibility, particularly for use in wire coating. It has been found that a superior coating composition is obtained when the molar ratio of the toluene triisocyanate to the diisocyanate reacted with the glycol is from about 1:9 to about 9:1 and preferably is about 1:4 to about 1:1. The amount of glycol reacted with this mixture of isocyanates is that which would contain an amount of hydroxyl groups equivalent to the total isocyanate groups in the isocyanate mixture. Thus, if the isocyanate mixture contains 2 moles of toluene triisocyanate and 8 moles of a diisocyanate, there would be present a total of 22 isocyanate groups and, therefore, 11 moles of glycol would be required to react with this isocyanate mixture.

While in the foregoing examples decamethylene glycol has been used, the invention is not restricted to this particular glycol, since any glycol may be used as, for example, ethylene glycol, triethylene glycol, pentaethylene glycol, hexamethylene glycol, polyethylene glycol, etc. For wire coating a higher molecular weight glycol such as the decamethylene glycol of the examples is preferred since the shorter chain glycols tend to give a more brittle product. However, polymers of the latter type are useful in many other coating applications.

In a similar fashion, any diisocyanate may be used in the preparation of the new coating compositions of this invention as, for example, aliphatic diisocyanates such as hexamethylene diisocyanate, decamethylene diisocyanate, etc., cycloalkylene diisocyanates such as cyclohexylene diisocyanate, and aromatic diisocyanates such as benzene diisocyanate, toluene diisocyanate, xylene diisocyanate, chlorophenylene-2,4-diisocyanate, etc.

The toluene-2,4,6-triisocyanate used in preparing these new coating compositions is readily prepared from the commercially available trinitrotoluene. The TNT may be chemically or catalytically reduced to the corresponding toluene-2,4,6-triamine which is in turn reacted with phosgene to obtain the triisocyanate. The latter reaction is carried out by heating a suspension of a salt of the amine such as toluene triamine trihydrochloride in an inert solvent with phosgene to a temperature of about 75° C. to about 160° C. The toluene triisocyanate may then be isolated by removal of the solvent.

The reaction between the glycol and this mixture of isocyanates takes place with surprising ease. A solution containing the three ingredients will gel on standing even at room temperature and films of such a solution will air dry to a hard, tough coating. Thus, a solution of the three ingredients must be used at once. The reaction may also be brought about by partially reacting the glycol and diisocyanate and then adding a solution of the toluene triisocyanate as was done in Example 1 or the diisocyanate and the toluene triisocyanate may each be partially reacted with the glycol and then mixed just before use as was done in Example 2.

Solvents which may be used for preparing the solution of glycol and di- and tri-isocyanate which are reacted are those which are inert under the conditions of the reaction; i. e., those which are unreactive with the glycol or the isocyanates. The solvent should also be one in which the reaction products are soluble. Suitable solvents are esters such as ethyl acetate, n-butyl acetate, amyl acetate, etc., dioxane, etc.

As pointed out above, the reaction between the glycol and the toluene triisocyanate and the diisocyanate will take place at room temperature. However, the reaction is greatly accelerated by heat. Consequently, in wire coating operations where it is desired to dry or set the coating as rapidly as possible, baking of the wire will bring about the reaction with the formation of an insoluble coating of the reaction product and evaporation of the solvent. Thus, wire, or any other article, may be coated with the compositions of this invention by simply dipping in a solution of the three ingredients, or partially reacted ingredients, and then baking. Since the reaction takes place at relatively low temperatures, high baking temperatures are not required and will depend only upon the volatility of the solvent and the speed with which the wire is passed through the oven.

The superior properties of wire coated with the new coating compositions of this invention are illustrated by the following examples.

*Example 5*

Copper wire (0.032 inch) was coated by dipping in the coating composition solution of Example 1 and baking in an oven after each coat, 3 to 5 coats of the composition being applied. The samples of wire were then tested for their increase in diameter (the difference in diameter before and after removing the coating by burning), the scrape resistance, flexibility and elasticity, and solvent resistance. The results of these tests are given in the table below. The scrape or abrasion resistance is a measure of the hardness and toughness of the coating and as determined in this example is the load required, when the test wire is pulled at right angles to a piece of music wire mounted in a jig, to cause sufficient scraping to bare the copper. The flexibility is the ability of the wire to withstand bending around itself and the elasticity is the ability to withstand being stretched 33⅓% without cracking of the coating. The completeness of cure governs the solvent insolubility of the coating and is tested by boiling the coated wire in a mixture of 70% ethanol and 30% toluene for 5 minutes. According to the specifications for wire coatings, there should be no swelling or blistering of the coating at the end of this time.

| Baking Temperature, °F. | Baking Time, Seconds | Number of Coats | Addition to Diameter, Inch | Scrape Resistance, Grams | Completeness of Cure [1] | Flexibility | Elasticity |
|---|---|---|---|---|---|---|---|
| 450 | 30 | 3 | 0.0026 | 1,000 | Pass | Good | Good. |
|  | 60 | 3 | 0.0020 | 1,000 | ---do--- | ---do--- | Do. |
| 500 | 30 | 3 | 0.0024 | 1,000 | ---do--- | ---do--- | Do. |
|  | 60 | 5 | 0.0019 | 1,200 | ---do--- | ---do--- | Do. |
| 550 | 30 | 3 | 0.0022 | 1,200 | ---do--- | ---do--- | Do. |
|  | 60 | 4 | 0.0023 | 1,000 | ---do--- | ---do--- | Do. |
| 600 | 30 | 3 | 0.0021 | 900 | ---do--- | ---do--- | Do. |

[1] In each case there was no swelling or blistering after 5 minutes boiling in 70% ethanol—30% toluene solvent and when completely dry after the solvent immersion, the coatings returned to their original hardness.

Example 6

Copper wire was coated by dipping in the coating composition prepared as described in Example 2 and baking at 460°–480° F. after each coat 4 coats of the composition being applied. Samples of this coated wire were then tested and found to have excellent flexibility even at low temperatures, good elasticity and dielectric strength, a scrape resistance of 900 grams and good resistance to the action of solvents.

Example 7

Example 6 was repeated using the coating composition of Example 3. The coated wire so produced had good flexibility, elasticity, excellent resistance to solvents and a scrape resistance of 1200 grams. This wire coating had an outstandingly high dielectric strength.

The above examples illustrate the superior properties of wire coated with the coating composition of this invention. The high dielectric strengths and excellent adhesion to metals of these coatings makes them particularly valuable for the insulation of wire. In addition, these coatings have an unusual degree of hardness and scrape resistance without suffering any loss in flexibility and elasticity. In fact, the high degree of flexibility of these films even at very low temperatures eliminates the necessity of incorporating plasticizers, etc., in the coatings and, as a result, these coatings are very resistant to the action of solvents such as are encountered in the use of insulated wire for refrigeration, petroleum industry applications, etc. They also have excellent alkali resistance and low water absorption. As may be seen from the foregoing examples, the coating is readily applied by dipping; however, any other process may be used for applying the coating as spraying, painting, etc.

The coating compositions of this invention are also useful as protective coatings for wood and metals as the following examples illustrate.

Example 8

The coating composition of Example 2 was diluted with dioxane to about 20–30% solids and was sprayed on birch wood panels. The coating dried within 15 minutes at room temperature and a second coating was applied and again air dried in less than 15 minutes. The coating so obtained was a smooth, glossy, transparent film which was extremely hard and tough and had excellent adhesion to the wood. It was resistant to weathering and to alkali.

Example 9

Strips of black iron, tin plate, magnesium alloy and stainless steel were coated as described in Example 8. In each case the coating had excellent adhesion and flexibility, and was a very hard, tough film, which properties were retained on aging.

Thus the coating compositions of this invention not only have outstanding properties for wire coating and insulation, but are useful in many protective coating applications. They may be used on wood for protection against weathering, alkali, etc., or on various metal objects for decorative and protective purposes. If an opaque or colored coating is desired, these coatings may be pigmented before application. Many other variations in their use are likewise possible. Any method of application and drying may be used.

As illustrated by the above examples, solutions of these coatings may be applied and then simply air dried or they may be baked if a harder film or greater drying speed is desired.

What I claim and desire to protect by Letters Patent is:

1. A coating composition comprising the reaction product of a mixture of isocyanates, comprising toluene triisocyanate and an organic diisocyanate in a molar ratio of about 1:9 to about 9:1, with the theoretical amount of a glycol, said glycol and organic diisocyanate containing hydroxyl and isocyanate groups, respectively, as the sole reactive substituents.

2. A coating composition comprising the reaction product of a mixture of isocyanates, comprising toluene triisocyanate and an organic diisocyanate in a molar ratio of about 1:4 to about 1:1, with the theoretical amount of a glycol, said glycol and organic diisocyanate containing hydroxyl and isocyanate groups, respectively, as the sole reactive substituents.

3. A coating composition comprising the reaction product of a mixture of isocyanates, comprising toluene triisocyanate and toluene diisocyanate in a molar ratio of about 1:4 to about 1:1, with the theoretical amount of a glycol, said glycol containing hydroxyl groups as the sole reactive substituents.

4. A coating composition comprising the reaction product of a mixture of isocyanates, comprising toluene triisocyanate and an organic diisocyanate in a molar ratio of about 1:4 to about 1:1, with the theoretical amount of decamethylene glycol, said organic diisocyanate containing isocyanate groups as the sole reactive substituents.

5. A wire coating composition comprising the reaction product of a mixture of toluene triisocyanate and toluene diisocyanate in a molar ratio of about 1:4 to about 1:1, with the theoretical amount of decamethylene glycol.

6. A wire having baked thereon a coating composition comprising the reaction product of a mixture of isocyanates, comprising toluene triisocyanate and an organic diisocyanate in a molar ratio of about 1:9 to about 9:1, with the theoretical amount of a glycol, said glycol and organic diisocyanate containing hydroxyl and isocyanate groups, respectively, as the sole reactive substituents.

7. A wire having baked thereon a coating composition comprising the reaction product of a mixture of isocyanates, comprising toluene triisocyanate and an organic diisocyanate in a molar ratio of about 1:9 to about 9:1, with the theoretical amount of decamethylene glycol, said organic diisocyanate containing isocyanate groups as the sole reactive substituents.

8. A wire having baked thereon a coating composition comprising the reaction product of a mixture of isocyanates, comprising toluene triisocyanate and toluene diisocyanate in a molar ratio of about 1:4 to about 1:1, with theoretical amount of decamethylene glycol.

DAVID S. BRESLOW.

REFERENCES CITED

The following references are of record in the file of this patent:

Pinner, Plastics, May 1947, pages 257–262.
Bayer, Modern Plastics, June 1947, pages 149–152, 250, 252, 254, 256, 258, 260, 262.